United States Patent [19]
Yanase

[11] Patent Number: 5,771,480
[45] Date of Patent: Jun. 23, 1998

[54] METHOD AND DEVICE FOR IDENTIFYING KIND OF TIRE

[75] Inventor: Minao Yanase, Kobe, Japan

[73] Assignees: Sumitomo Rubber Industries, Ltd., Hyogo-ken; Sumitomo Electric Industries, Ltd., Osaka-fu, both of Japan

[21] Appl. No.: 779,080

[22] Filed: Jan. 8, 1997

[30] Foreign Application Priority Data

Jan. 12, 1996 [JP] Japan .................................. 8-003658

[51] Int. Cl.⁶ .............................................. B60C 25/00
[52] U.S. Cl. ................................... 701/80; 73/146
[58] Field of Search ................... 73/146; 364/426.01, 364/426.018, 426.025, 426.027; 701/70, 74, 80, 84

[56] References Cited

U.S. PATENT DOCUMENTS

| | | | |
|---|---|---|---|
| 4,224,597 | 9/1980 | DiCecio | 73/146 |
| 4,855,917 | 8/1989 | Sawano et al. | 364/426.025 |
| 4,912,967 | 4/1990 | Shiraishi et al. | 73/146 |
| 4,969,212 | 11/1990 | Walter | 73/146 |
| 5,321,628 | 6/1994 | Beebe | 73/146 |
| 5,394,329 | 2/1995 | Bridgens | 364/426.025 |
| 5,513,523 | 5/1996 | Sekiya et al. | 73/146 |
| 5,635,623 | 6/1997 | Simon | 73/146 |

FOREIGN PATENT DOCUMENTS

| | | |
|---|---|---|
| 410941A1 | 10/1994 | European Pat. Off. . |
| 636503A1 | 2/1995 | European Pat. Off. . |

*Primary Examiner*—George M. Dombroske
*Attorney, Agent, or Firm*—Birch, Stewart, Kolasch & Birch, LLP

[57] ABSTRACT

A tire identifying method comprising measuring each rotation speed of four tires fitted to wheels of a vehicle; calculating a ratio of front wheel rotation speed to rear wheel rotation speed from the measured value; and identifying the kind of tire fitted by comparing the calculated front-rear wheel ratio with a function of speed and front-rear wheel ratio prepared on the basis of data from a tire whose kind is previously known. Utilization might be made of the means for measuring the rotation of tire such as ABS which is provided on the vehicle control device, thus requiring small initial cost.

12 Claims, 10 Drawing Sheets

METHOD AND DEVICE FOR IDENTIFYING KIND OF TIRE

BACKGROUND OF THE INVENTION

The present invention relates to a method and device for identifying a particular kind of tire. More particularly, the present invention relates to a method and device for identifying a particular kind of tire having a difference in pattern stiffness which substantially influences the cornering performance, and is especially effective for identifying a tire for use in the summer or for use in the winter.

In recent years, there have appeared many devices designed to improve performance and safety of vehicles based on the tire rotation speed information. They are known, for example, the ABS (anti-lock braking system), the TCS (traction control system), the NAVI (navigation system), the pneumatic pressure loss alarm system, and the like. These systems are designed to presume the behavior of vehicles from the information on tire rotation speed to control vehicles or provide information so as to allow the driver to perform more comfortable and safe driving.

On the other hand, the tire has grooves engraved therein for the discharge of water. In such a tire, due to the presence of vertical grooves and lateral grooves, there are formed rubber blocks surrounded by grooves. The large blocks are less likely to show shearing deformation in the forward and backward as well as sideways directions, and also have a large degree of stiffness. As such, generally tires having tread patterns comprising a large block are called tires having large pattern stiffness.

The pattern stiffness of tire has a large influence on the cornering power and cornering force as well as the slip property such that a tire having large pattern stiffness exhibits a large cornering power. Accordingly, in order to presume the behavior of the vehicle based on the information on the rotation of the tire, it is necessary to understand the performance of the tire.

However, conventionally, the vehicle control devices as described above are in many cases tuned to meet the tires fitted to the a vehicle. Accordingly, when the tires have been changed to those of substantially different specification, the presumption of vehicle performance becomes substantially different from the real state, so that there is a problem that the accuracy of the information provided to the driver cannot be assured.

In view of the above problem, there is desired a method and device whereby when the tire is changed, the tuning can be automatically made to meet the characteristics of the newly set tire.

Further, in order to provide such a device at a low cost, it is desirable to practice by using the means for measuring the tire rotation information such as an angular velocity sensor originally furnished on a vehicle control device per se. However, such a method and device for identifying tire replacement by using the tire rotation information are difficult and have not been used in practice.

The present invention has been developed in conformity with such demands, and has as its object to provide a method and device for identifying the kind of tire from the rotation information of the tire.

Further, it is an ultimate object of the present invention to improve the precision of the vehicle control device such as the ABS by self-containing or connecting the method and device of the present invention in the above vehicle control device and by re-tuning the vehicle control device to be compatible with the particular type of tire.

The present invention has been developed by paying attention to the fact that differences in pattern stiffness have a close relation with the cornering performance which is considered to give the largest influence on the behavior of the vehicle. The effect is remarkable when replacement is made from tires for summer use to tires for winter use (or vice versa). This is because, in general, tires for summer use have a large amount of stiffness, and tires for winter use have a small amount of stiffness. Further, due to the recent extension of the abrasion life of a tire by the adoption of the radial form and the like, the occasions for replacement of a tire have decreased. However, the replacements from the tires for summer use to those for winter use have become customary in many regions, so that the method and device for identifying the particular kind of tire are in high demand.

SUMMARY OF THE INVENTION

In accordance with the present invention, there is provided a tire identifying method comprising:

(a) measuring the rotational speed of each of the four tires fitted to wheels of a vehicle;

(b) calculating the ratio of front wheel rotation speed to rear wheel rotation speed from the measured value; and (c) identifying a kind of tire fitted by comparing the calculated front-rear wheel ratio with a function of speed and the front-rear wheel ratio prepared on the basis of data from a tire whose kind is previously known.

It is desirable to identify whether the fitted tire is of the same kind as the tire of the known kind or not by determining the prescribed judgement value range based on the function of speed and front-rear wheel ratio and by judging whether the calculated value of the front-rear wheel ratio lies within the judgement value range or not.

Alternatively, in the case where the tires whose kind is known are of the two tires of different stiffness, it is preferable to set a threshold value between the two functions of speed and front-rear wheel ratio prepared from data of the two tires, and to identify to which kind of the two kinds of tires having different stiffness the fitted tire belongs, depending on which side of the threshold value the front-rear wheel ratio value lies.

In accordance with the present invention, there is further provided a tire identifying method comprising:

(a) measuring the rotational speed of each of the four tires fitted to the wheels of a vehicle, and measuring the front-rear direction acceleration of the vehicle;

(b) calculating the ratio of front wheel rotation speed to rear wheel rotation speed from the measured value; and (c) identifying the kind of tire fitted by comparing the calculated front-rear ratio with a function of acceleration and front-rear wheel ratio prepared on the basis of data of front-rear ratio by the predetermined acceleration sequentially from a tire whose kind is previously known.

It is desirable to identify whether the fitted tire is of the same kind as the tire of known kind or not by determining the prescribed judgement value range based on the above function of acceleration and front-rear ratio wheel ratio and by judging whether the calculated value of the front-rear wheel ratio lies within the judgement value range or not.

Alternatively, in the case where the tires whose kind is known are of two tires of different stiffness, it is preferable to set a threshold value between the two function of acceleration and front-rear wheel ratio prepared from data of the two tires, and to identify to which kind of the two kinds of tires having different stiffness the fitted tire belongs, depending on which side of the threshold value the front-rear wheel ratio value lies.

In accordance with the present invention, there is also provided a tire identifying device comprising:

(a) rotation speed measuring means for measuring each rotation speed of four tires fitted to wheels of a vehicle; and (b) calculating and identifying means for identifying the kind of tire fitted by calculating the ratio of the front wheel rotation speed to the rear wheel rotation speed from the measured value using a rotation speed measuring means and by comparing the calculated front-rear wheel ratio as a function of speed with the front-rear wheel ratio prepared on the basis of data obtained from a tire which has been previously identified.

It is desirable if the device is so designed as to identify whether the fitted tire is of the same kind as the tire of the known kind or not by determining the prescribed judgement value range based on a function of speed and the front-rear wheel ratio, and by judging whether the calculated value of the front-rear wheel ratio lies within the judgment value range or not.

Alternatively, in the case where the tires whose kind is known are two tires of different stiffness, it is preferable to set a threshold value between the two functions of speed and front-rear wheel ratio prepared from data on the two tires, and to identify to which kind of the two kinds of tires having different stiffness the fitted tire belongs, depending on which side of the threshold value the front-rear wheel ratio value lies.

In accordance with the present invention, there is further provided a tire identifying device comprising:

(a) rotation speed measuring means for measuring the rotation speed of each of the four tires fitted to wheels of a vehicle and front-rear direction acceleration measuring means for measuring the front-rear direction acceleration of the vehicle; and (b) calculating and identifying means for identifying the kind of tire fitted by comparing the calculated front-rear wheel ratio with a function of acceleration and the front-rear wheel ratio prepared on the basis of data from a tire whose kind is previously known.

It is desirable that the device is so designed as to identify whether the fitted tire is of the same kind as the tire of known kind or not by determining the prescribed judgement value range based on a function of the acceleration and front-rear wheel ratio function, and by judging whether the calculated value of the front-rear wheel ratio lies within the judgment range or not.

Alternatively, in the case where the tires whose kind is known are two tires of different stiffness, it is preferable to set a threshold value between the two functions of acceleration and front-rear wheel ratio prepared from data on the two tires, and to identify to which kind of the two kinds of tires having different stiffness the fitted tire belongs, depending on which side of the threshold value the front-rear wheel ratio value lies.

The present invention will become more fully understood from the detailed description given hereinbelow and the accompanying drawings which are given by way of illustration only, and thus, are not limitative of the present invention, and wherein:

DETAILED DESCRIPTION OF THE DRAWINGS

DETAILED DESCRIPTION

Figure 1:
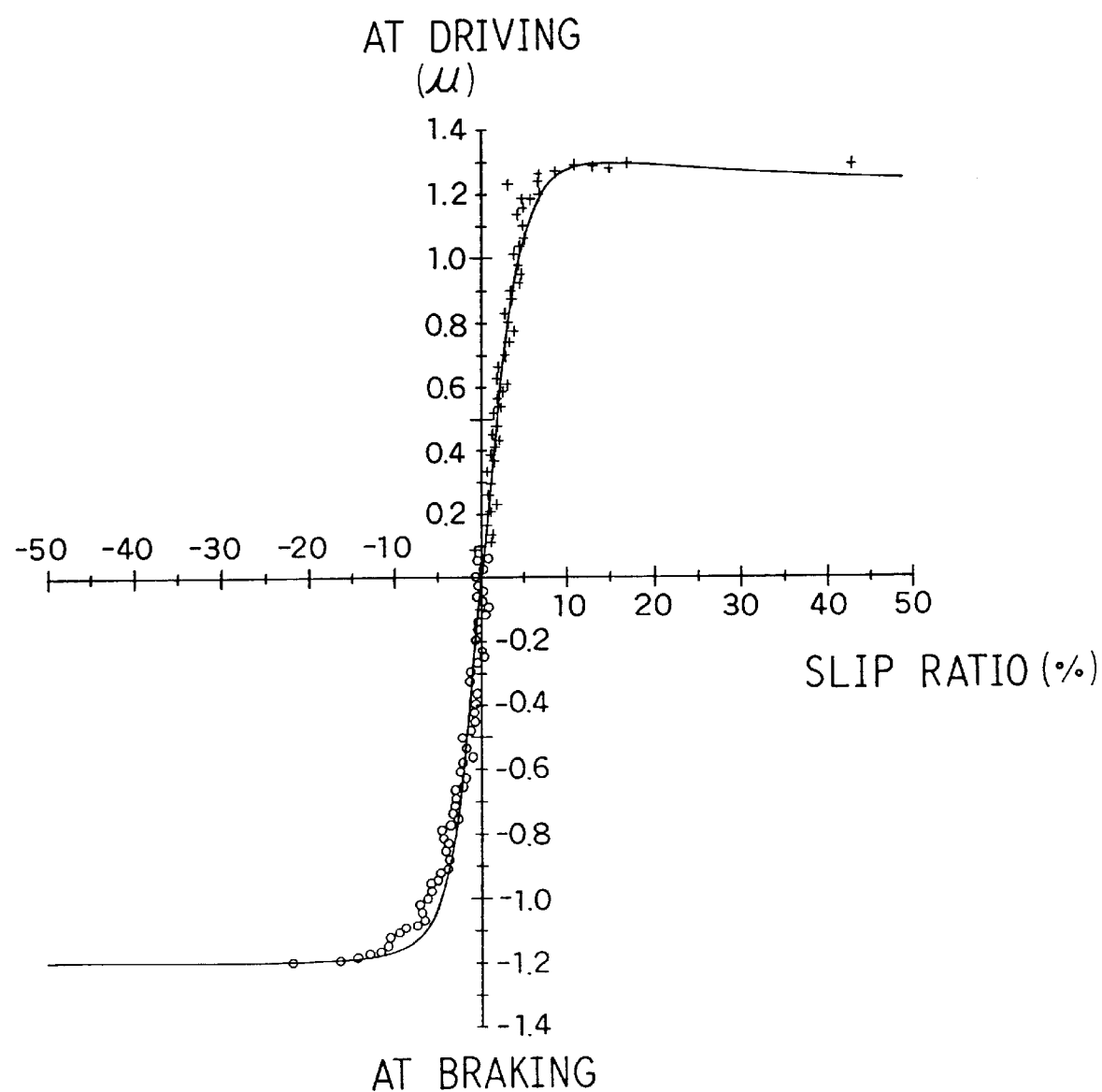
FIG. 1 is a view showing the relation between the slip ratio and the friction coefficient of the tire for summer use.

The tire identification method and device of the present invention are based on a recognition of the fact that the difference in the particular kind of tire leads to differences in the slip ratio of the driving wheel. Using the means for measuring the rotation speed of a wheel already provided on the vehicle control device such as ABS (angular speed sensors including the one which generates rotation pulses by using electromagnetic pickups to measure rotation speed from the number of pulses, or the one which measures the rotation speed from the voltage generated by utilizing rotation, such as a dynamo), the slip ratio of the driving wheel is calculated as a ratio of the front wheel rotation speed to the rear wheel rotation speed (hereinafter referred to as the front-rear wheel ratio). Then, by comparing the data on which the kind of tire is previously known (known data) with the data taken from the tire which is presently fitted (measured data), it is intended macroscopically to identify the kind of tire, including for example a judgment as to whether or not the fitted tire is of the same kind or type as that fitted to the vehicle at the time of the purchase of the vehicle.

Heretofore, it has been considered difficult to identify the kind of the tire by using the rotation information of tire. On the other hand, the ultimate object of the tire identifying method and device of the present invention is to convey the information concerning the particular type or kind of the running tire to the vehicle control devices such as ABS which is tuned to meet the performance of the tire, to elevate the precision of these devices, to determine accurately the behaviors of the vehicle in cornering and the like, and to make it possible to prevent danger.

Meanwhile, it is known that the cornering performance of a vehicle is attributed to the size of the pattern lateral stiffness of the tire. Also, the tire having largely different pattern lateral stiffness is considered to have large difference in pattern front-rear stiffness.

Accordingly, in the present invention, notice has been made not to the pattern lateral stiffness but to the slip ratio which is closely related with the pattern front-rear stiffness, and an attempt has been made to utilize the slip ratio to identify the kind of the tire. This is based on the idea that, if the tires having different pattern front-rear stiffness can be identified with the slip ratio, tuning can be made in conformity with it, thereby making it possible to anticipate, more accurately the behavior of the vehicle in cornering as it relates to pattern lateral stiffness.

The following equations show a general method for calculating the slip ratio.

<at driving> (Vb−Vr)/Vb×100 (%)

<at braking> (Vb−Vr)/Vr×100 (%)

where, Vr shows a road surface (or vehicle) speed, and Vb shows a rotation speed of tire.

When a driving force is applied to the driving wheel, slipping occurs on the driving wheel. Accordingly, by comparing the rotation speed of the driving wheel with the rotation speed of the driven wheel, the extent of slipping can be measured. This is because the rotation speed of the driven wheel is smaller than that of the driving wheel by the amount of the slip. In the present invention, there is so contrived as not to obtain slip ratio but to obtain the value of the rotation speed ratio of the driving wheel to the driven wheel substituted by the amount of the front-rear wheel ratio, thereby making it possible to simply identify the kind of tire.

The value of the front-rear wheel ratio is larger at the time when a large driving force is exerted, and can be more easily taken as standard for measurement and identification. The time when it is necessary to exert a driving force to the driving wheel is A) while running at a constant speed (while running at a constant speed coping with running resistance (friction force), pneumatic resistance and the like), B) while accelerating and C) while running to overcome a rising slope.

When running on a rising slope, a larger driving force is exerted than when running on a flat road, so that it is preferable to take the front-rear wheel ratio at that time as a basis for identification. However, due to the increase in the value of the front-rear wheel ratio, there is the fear of introducing a misrecognition that the tire has been replaced by one having a low tread stiffness. For this reason, it is difficult to judge, based only on information obtained by the rotation speed of the wheels of a vehicle running on a rising slope. Accordingly, in the present invention, it is preferable to exclude the data obtained while running the vehicle on a rising slope and to adopt the data of constant speed running and acceleration running on a flat road surface as the standards for identification.

As a method for excluding the data obtained by running on a rising slope, data sampling is desirable. It is preferable, for example, to record sampling data every minute over 1 to 2 hours, or to take sampling data once every hour for at least 24 hours (one day at the shortest) and to exclude abnormal data, because, in general, it is not conceivable from a normal road situation to continue rising on a slope for 1 to 2 hours.

The driving force while the running in acceleration include the two factors of driving force necessary for constant speed running and driving force necessary for acceleration. Although it is not possible to separate these two for comparison, it might be conceivable to compare data at the same acceleration speed with the average speed taken as optional.

Further, in the present invention, the known data and the measured data are compared using a functional relationship Examples of the functions are (1) the function of speed and front-rear wheel ratio, and (2) the function of acceleration and front-rear wheel ratio (average speed is optional).

Function (2) is intended to compare the known data and the measured data regardless of the average speed. For example, the front-rear wheel ratio of the rotation speed is obtained in the range of about 0.05 to 0.2 G of acceleration of the tire for summer use adjusted to a normal pneumatic pressure, at intervals of, for example, 0.05 G.

Then, by obtaining certain acceleration (average acceleration in sampling) up to about 0.05–0.2 G of acceleration, the known front-rear wheel ratio corresponding thereto in compared. If the measured acceleration does not come up to the table of 0.05 G step, the amount might be obtained by interpolation.

Figure 2:
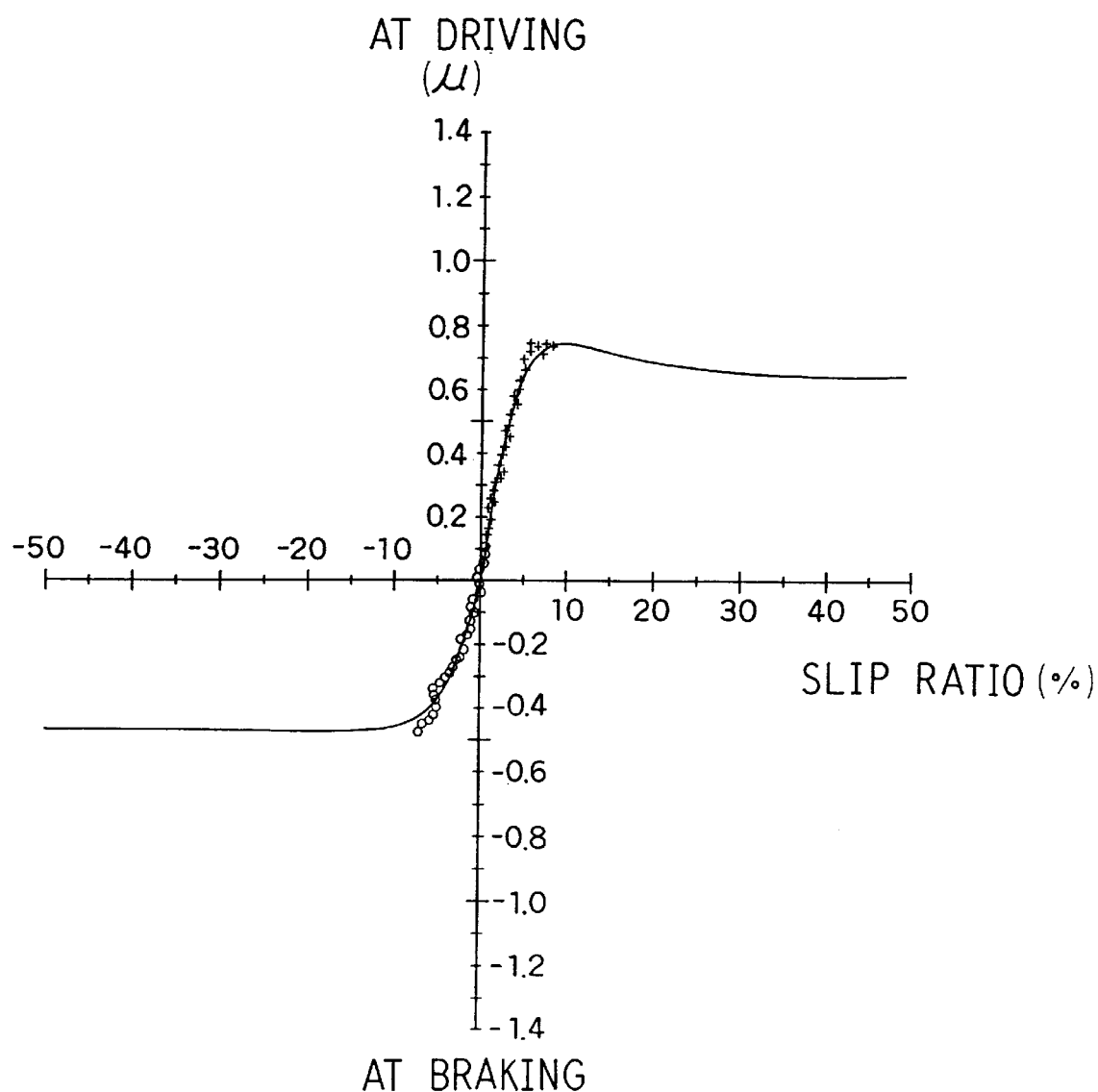
FIG. 2 is a view showing the relation between the slip ratio and the friction coefficient of the tire for winter use.

FIG. 1 and FIG. 2 show the slip ratios of the driving wheels for the tire for summer use (ref. FIG. 1) and for winter use (ref. FIG. 2) when running on a flat road surface at a constant speed (10 km/h). Also, Table 1 shows the data of the experiments conducted in preparing FIG. 1 and FIG. 2.

TABLE 1

| Maker name | DUNLOP | |
|---|---|---|
| Tire size | 195/60R15 | |
| Rim size | 6 | |
| Speed | 10 km/h | |
| Inflation pressure | Tire for summer use | 2.20 kg/cm2 |
| | Tire for winter use | 2.00 kg/cm2 |
| Load | Tire for summer use | 300 kg |
| | Tire for winter use | 350 kg |
| Slip angle | 0° | |

As shown in FIG. 1 and FIG. 2, between the tire for summer use and the tire for winter use, the influences from the road surface differ to a larger extent. Also, between the tire for summer use and the tire for winter use, $\mu$-S curves differ significantly. Especially, in the curve portions for a large driving force, i.e., in high speed running conditions resisting large pneumatic resistance where the difference is large and therefore a comparison is easy. In this way, it can be seen that the identification between a tire for summer use and the tire for winter use can be easily accomplished based on (1) a function of speed and on the front-rear wheel ratio.

Figure 3:
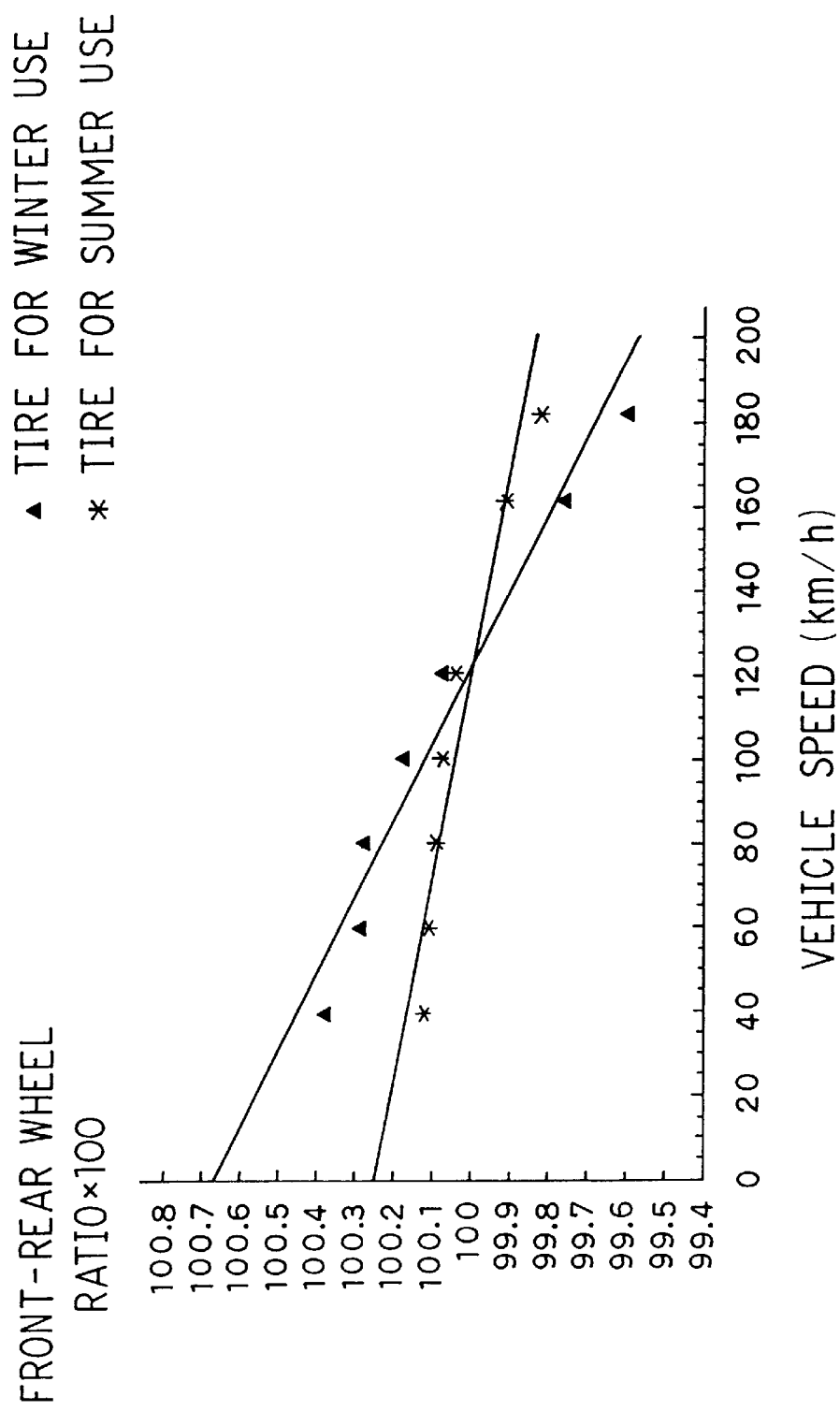
FIG. 3 is a graph showing the function of speed and front-rear wheel ratio.

FIG. 3 is a graphic representation of (1) a function of speed and front-rear wheel ratio based on the data of the tire for summer use and the tire for winter use.

FIG. 3 shows the front-rear wheel ratio obtained on the tire for summer use and the tire for winter use previously adjusted to a normal pneumatic pressure in the speed range of 40 km/h–180 km/h, for example, every 20 km/h. At this time, to obtain the front-rear wheel ratio from the average of the rotation speeds of the two front wheels and the average of the rotation speeds of the two rear wheels is preferable from the point of lessening the influence caused by turning. The data in FIG. 3 are taken on the basis of a FR vehicle.

In FIG. 3, as the speed increases, the front-rear wheel ratio decreases (increases in FF vehicle) in a secondary functional manner. Between the tire for summer use and the tire for winter use, the decrease rates thereof show a great difference.

In FIG. 3, a regression line by a primary function is drawn for simplification, but it is preferable to make regression by a secondary function. However, even from this graph, it can be seen that the front-rear wheel ratio is more severe in a tire for winter use having a small stiffness than in a tire for summer use.

Figure 4:
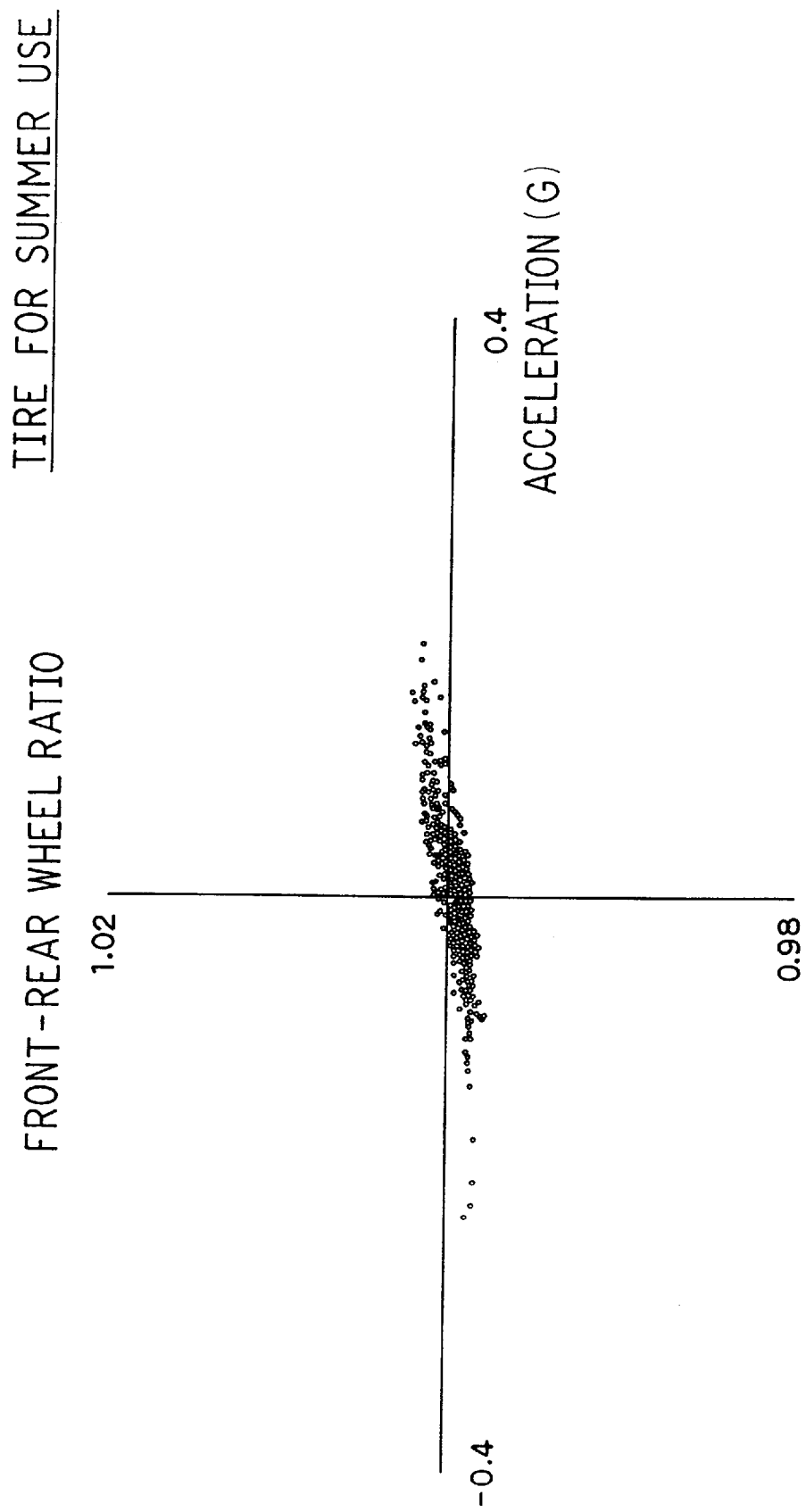
FIG. 4 is a data table of acceleration (average speed is optional) and front-rear wheel ratio of the tire for summer use.
Figure 5:
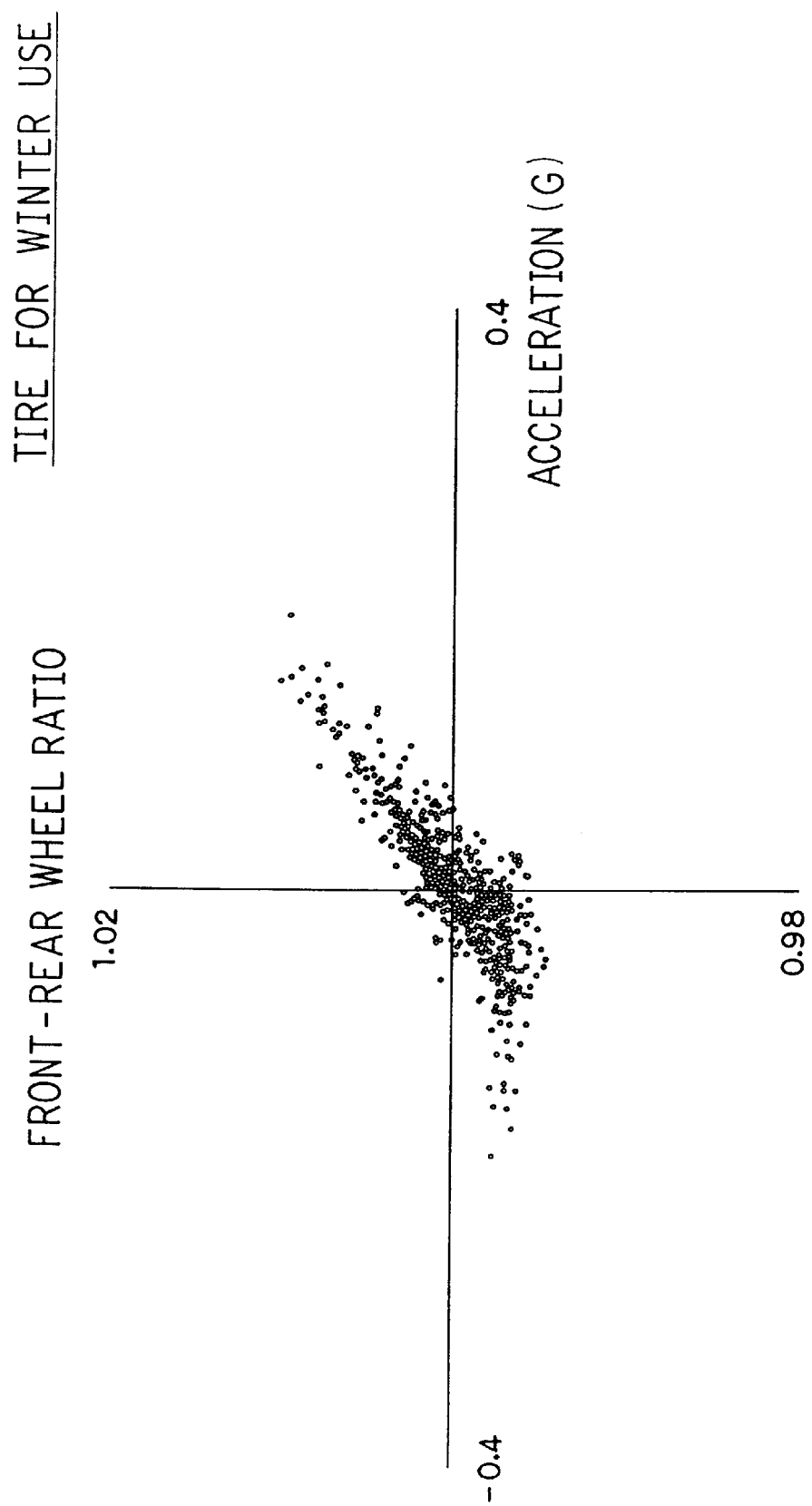
FIG. 5 is a data table of acceleration (average speed is optional) and front-rear wheel ratio of the tire for winter use.

Also, FIG. 4 and FIG. 5 show plate of the measured values in the case of linear running (average speed is optional) on a flat road surface for the purpose of preparing (2) acceleration to the front-rear wheel ratio function. FIG. 4 shows the function of a tire for summer use, and FIG. 5 that for winter use (FF vehicles respectively).

Figure 6:
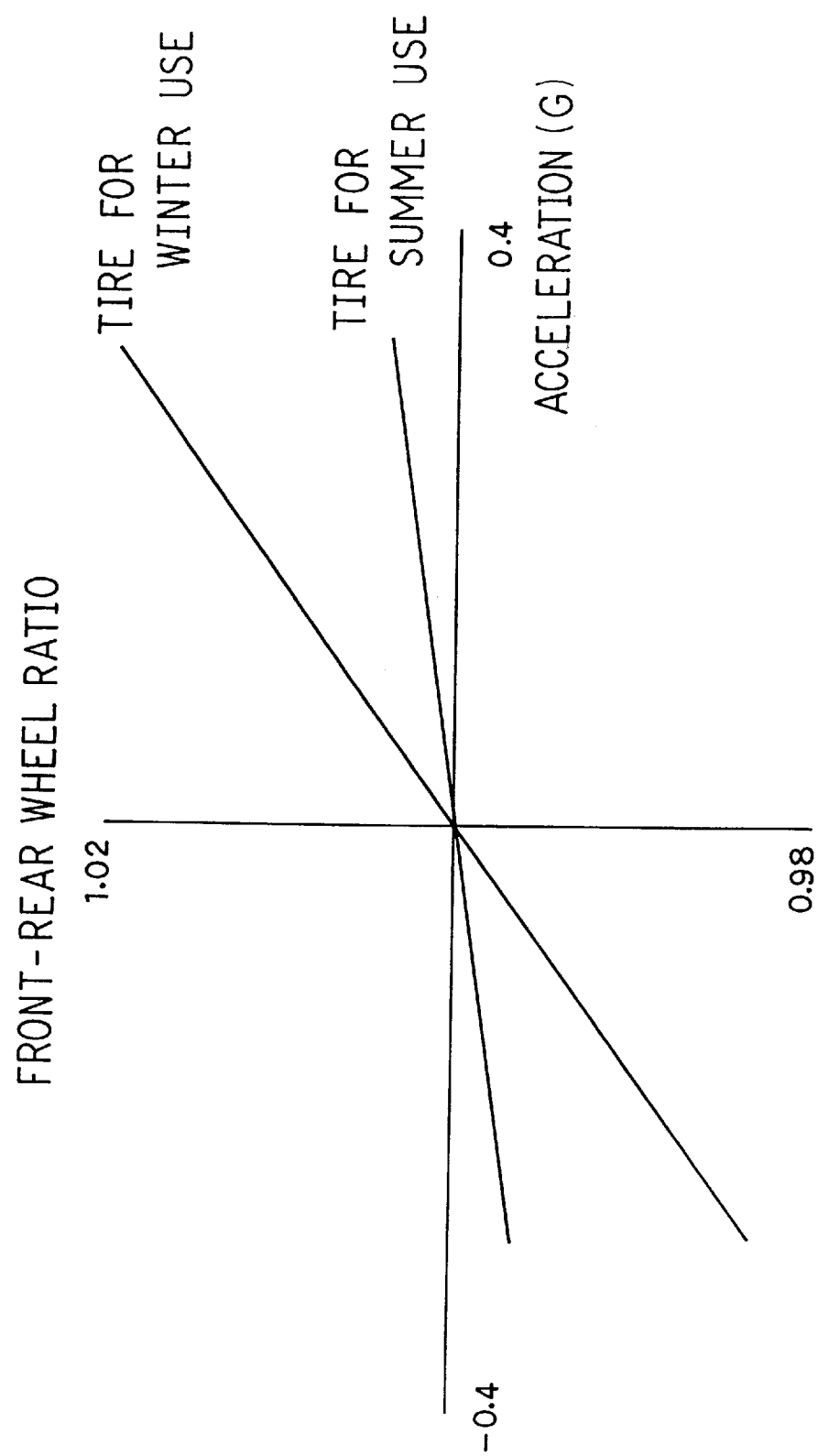
FIG. 6 is a regression line of the function of acceleration (average speed is optional) and front-rear wheel ratio prepared on the basis of FIG. 4 and FIG. 5.

As shown in FIG. 4 and FIG. 5, the increase rates of front-rear wheel ratio show great differences between the tire for summer use and the tire for winter use, and they can be regressed to, for example, primary functions. FIG. 6 shows the regression lines obtained from FIG. 4 and FIG. 5 and summarized into a single form.

The methods of making a comparison by using a function include, besides the method of determining the judgement value range to be described later and the method of determining a threshold value between the two functions of summer use tire and winter use tire, a method of preparing a regressive function from the data during running and comparing the coefficients of the prepared regressive functions with the coefficient of the regressive function prepared from known data.

The contents which are most desired to be known by the vehicle control device by using the functions as described above are whether or not the present tuning factor is coordinated with the fitted tire.

In view of the above, it is preferable to make it possible to identify, for example, whether 1) the tire of the same kind as that initially fitted to the vehicle is fitted even at present or not; or 2) which kind of the two types of tires typically different in stiffness (as represented by summer use tire and winter use tire) is fitted at present. However, besides the above, there may be applicable a method of identifying more than three kinds of tires by preparing to input the known data of not less than three kinds and determining which is the nearest, or a method of identifying whether the specified tire is fitted at present or not by preparing to input one specified data.

Next, based on FIGS. 7 to 10, the method and device for identifying matters 1) and 2) stated above will be explained. In general, the vehicle is fitted with a tire for summer use as a standard, and it is considered most effective to detect the replacement of the tire from the summer use one to the winter use one. Therefore, the explanation is given on the assumption of such a case.

Figure 7:
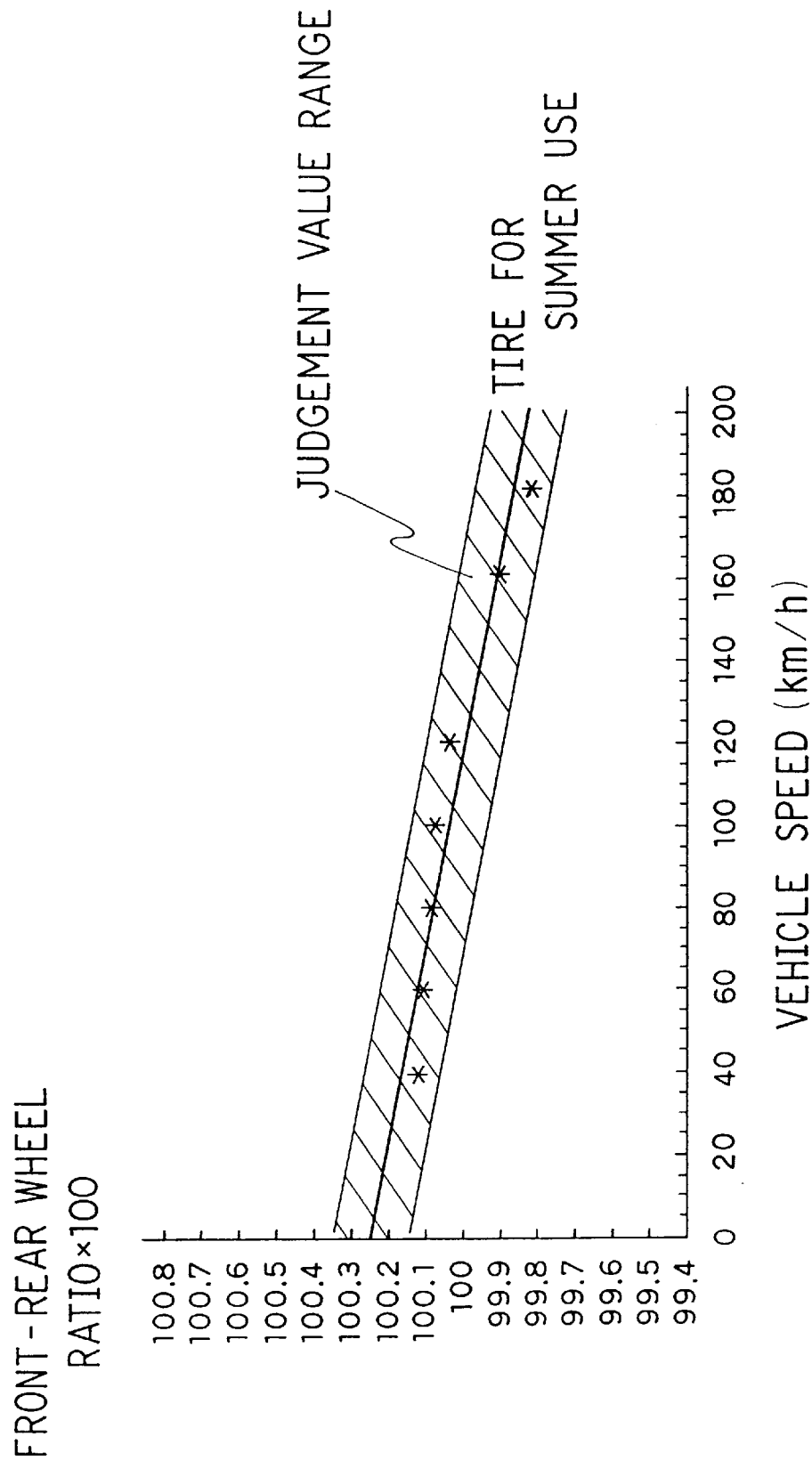
FIG. 7 is a graph showing the judgment value range of the tire for summer use determined on the basis of FIG. 3.
Figure 8:
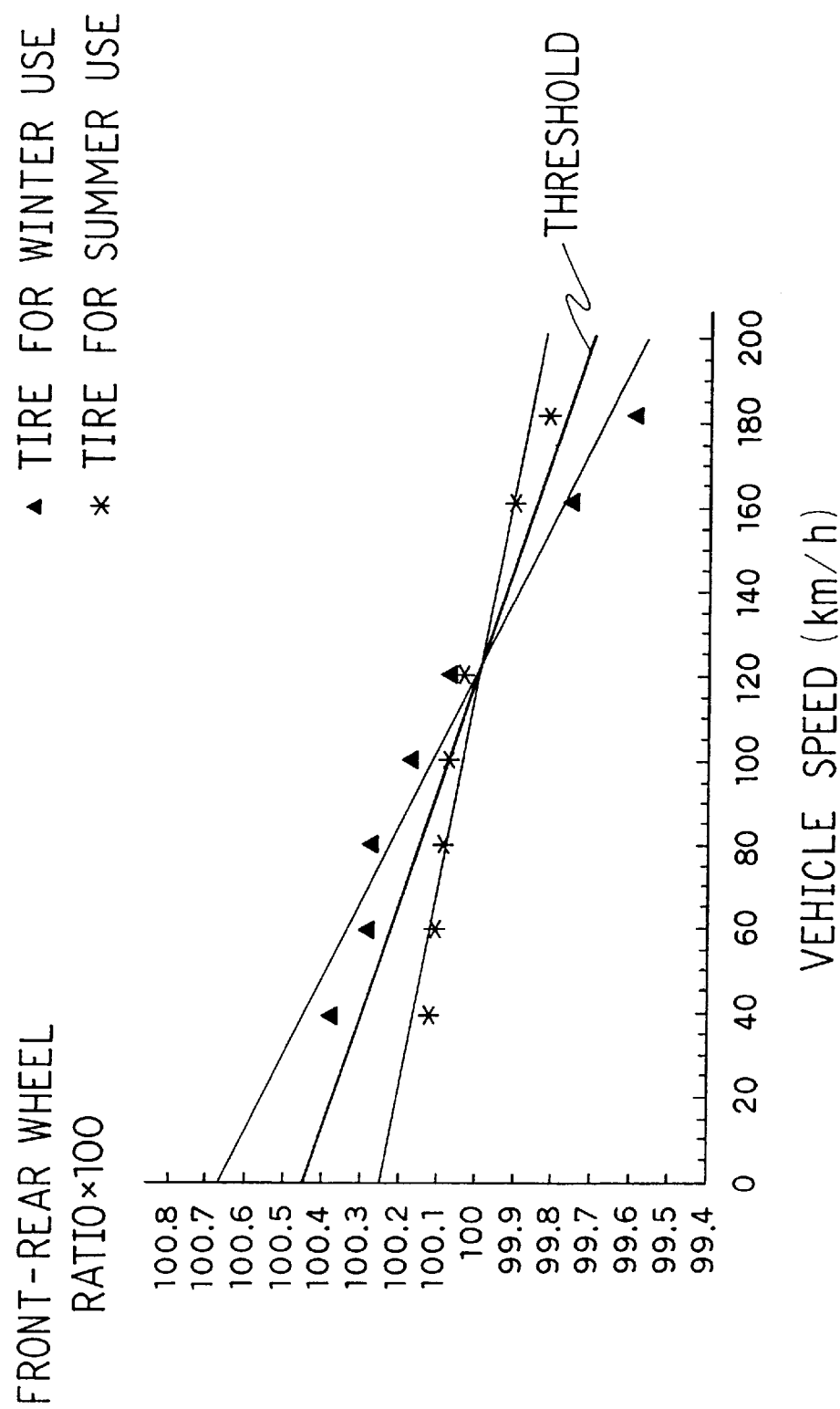
FIG. 8 is a graph showing the threshold value set on the basis of FIG. 3.
Figure 9:
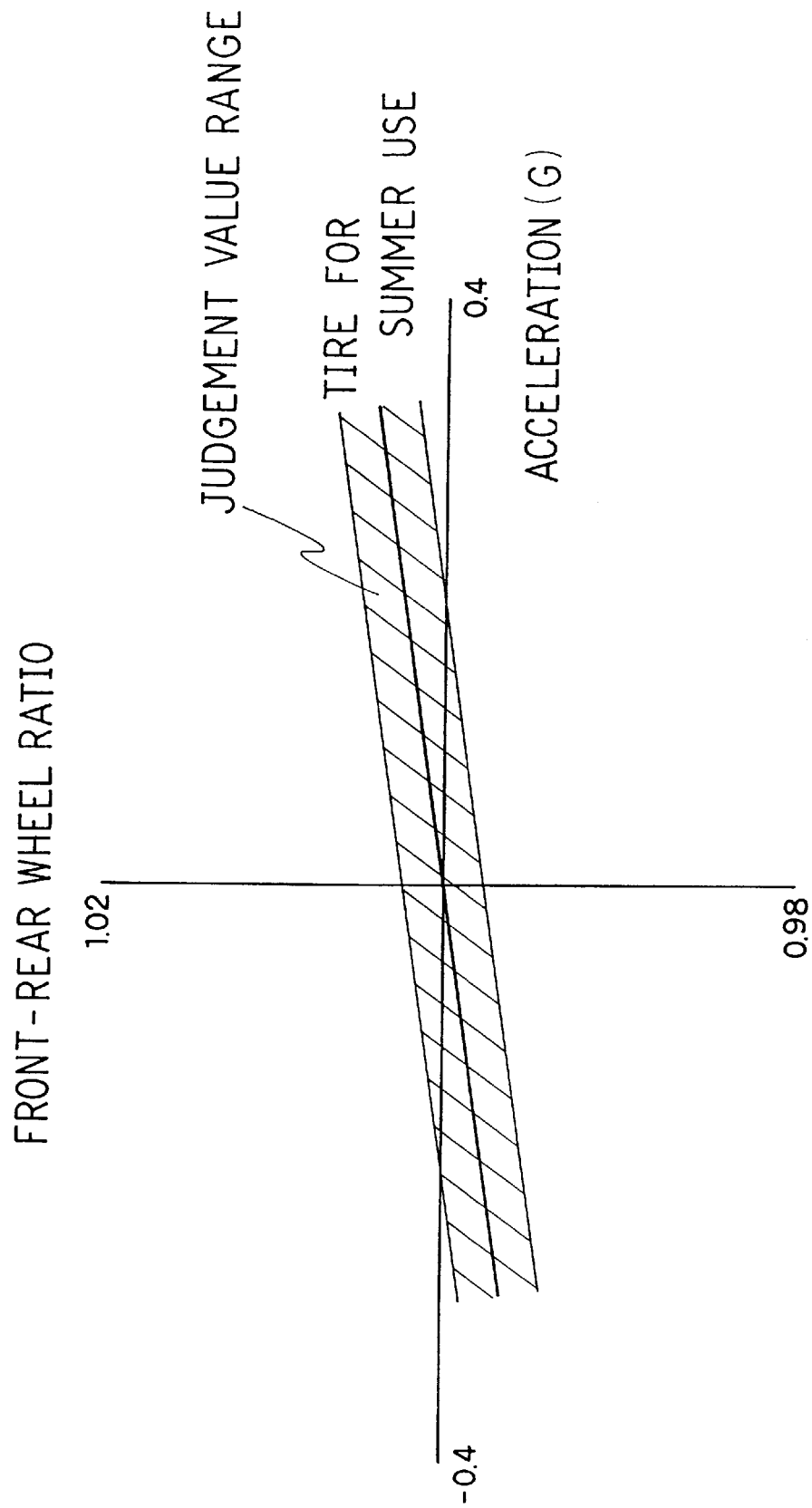
FIG. 9 is a graph showing the judgment value range of the tire for summer use determined on the basis of FIG. 6.
Figure 10:
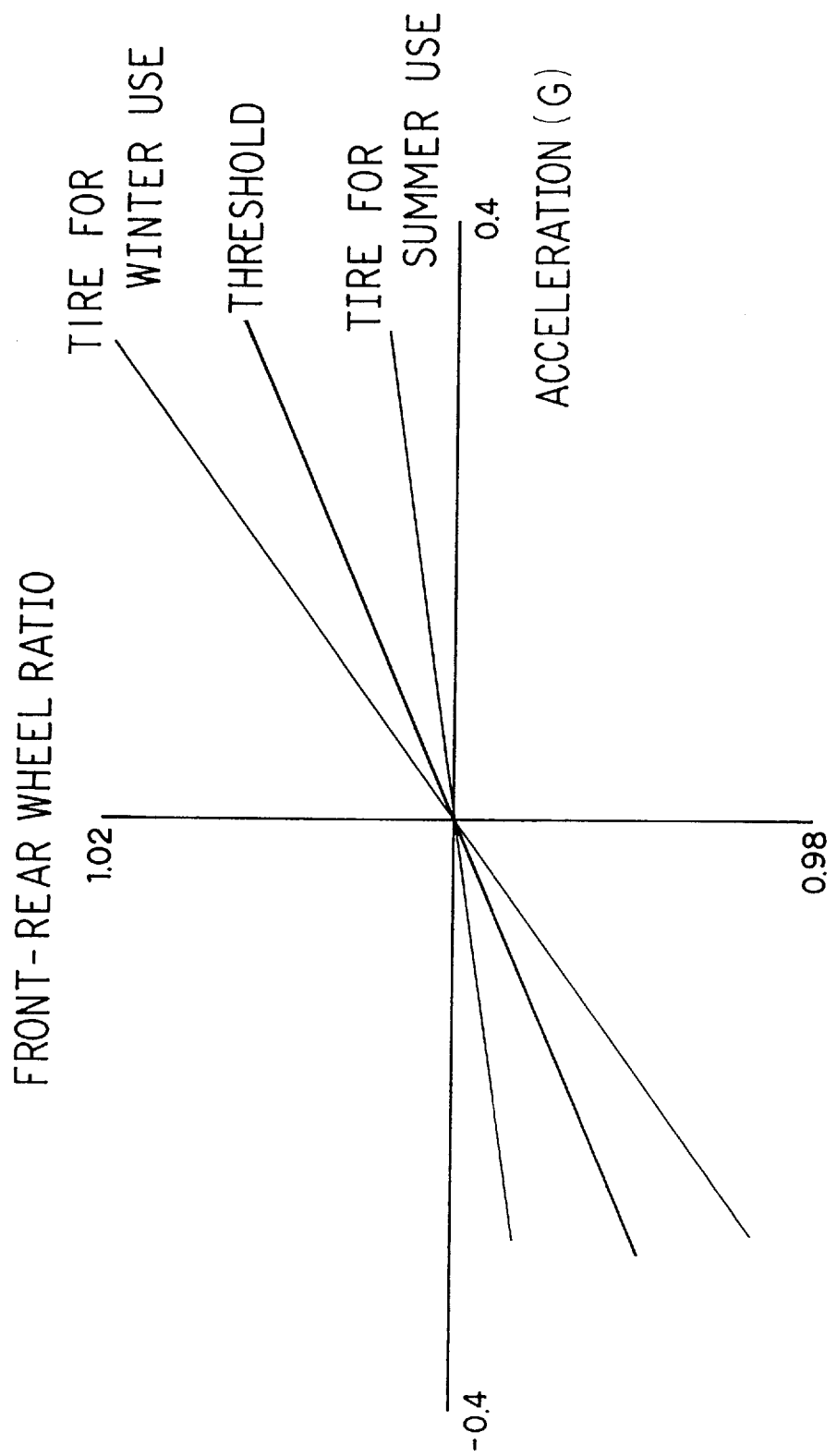
FIG. 10 is a graph showing the threshold value set on the basis of FIG. 6.

FIG. 7 and FIG. 9 show the case of determining the judgement value range so as to make it possible to carry out the identification of the above (1), and FIGS. 8 and 10 show that the threshold values are set so as to make it possible to carry out the identification of (2) above.

FIG. 7 is based on the graph of the tire for summer use shown in FIG. 3. The judgement value range is preferably determined appropriately depending on the scattering of the data, or preferably determined by comparing with the data of the tire for winter use.

Identification is performed during the running according to the following steps:

(a) Rotation speed of four tires fitted to wheels of a vehicle is measured.

(b) Front-rear wheel ratio is calculated on the basis of the measured data.

(c) Identification is made as to whether the calculated value of front-rear wheel ratio lies within the judgement value range shown in the graph of FIG. 7.

If the value is within the judgement value range, it follows that the tire has not been replaced, but if it is not within the judgement value range, then it is identified that the tire was changed to the one other than that for summer use (e.g., the tire for winter use).

Though the judgment value range of FIG. 7 is set at 0–200 km/h, when compared with the value of the tire for winter use, the difference tends to appear remarkably if the value falls within the range of 150–180 km/h. Therefore, it is preferable to make comparison in this range (preferably in the range of 150–160 km/h).

As a device for carrying out such a process, the tire identifying device of the present invention comprises:

(a) rotation speed measuring means for measuring the rotation speed of four tires fitted to wheels of a vehicle; and (b) calculating and identifying means for calculating the ratio of the front wheel rotation speed to the rear wheel rotation speed from the measured value by the above rotation speed measuring device and identifying the kind of the fitted tire from the calculated front-rear wheel ratio value. The calculating and identifying means is so constituted as to be capable of identifying as to whether the calculated front-rear wheel ratio value is within the above identification value range of FIG. 7.

On the other hand, it is preferable for the ECU of the vehicle control device such as ABS to hold both tuning factors for the tire for summer use and the tire for winter use. In the vehicle control device constituted to make it possible to carry out the tire identifying method of the present invention, or in the vehicle control device connected with the tire identifying device of the present invention, as described above, once it is determined that one other than a summer use tire is fitted, the mode is automatically changed to the tuning factor of a tire for winter use. If the calculated value comes within the judgement value range, the device judges that the tire has been returned to the one for summer use, and the mode is automatically changed to the tuning factor of the tire for summer use. On the other hand, manual changeover might be feasible.

In the case where the ECU of the vehicle control device is allowed to retain only the tuning factor for the tire for summer use, when it is judged that the fitted tire is not that for summer use, means might be taken to notify the driver to that effect to avoid danger.

Next, explanation is given on the method and device for carrying out identification as to which kind is fitted of the two types having typically different stiffness in the above (2) (represented by the tire for summer use and the tire for winter use), based on FIG. 8.

FIG. 8 shows the threshold value set on the basis of the graph of FIG. 3. The threshold value is provided just at the intermediate part between the two values.

Here, FIG. 8 shows regression to the primary function, but regression to the secondary function might be acceptable. In these cases, it is desirable to take the value lying between the two regressive curves (intermediate point is presumed to be preferable) as the threshold value.

The identification is carried out during running by the following steps.

(a) Rotation speed of four tires fitted to wheels of a vehicle is measured.

(b) Front-rear wheel ratio is calculated on the basis of the measured data.

(c) Identification is made as to whether the calculated value of front-rear wheel ratio lies within the judgement value range shown in the graph of FIG. 8.

For example, when the front-rear wheel ratio value calculated at not more than about 120 km/h is higher than the threshold value, it is judged to be the tire for winter use, whereas when it is lower than the threshold value, it is judged to be a tire for summer use. In case of the front-rear wheel ratio value being above 120 km/h, the relation is vice versa.

As shown in FIG. 8, it might be so arranged as not to carry out the identification in the whole range of 0–200 km/h but to calculate the average front-rear wheel ratio, for example, in the range of 150–160 km/h, and to make a comparison between the average and the threshold value.

Further, the front-rear wheel ratio might be calculated on all running speeds to prepare a function of speed and front-rear wheel ratio (preferably secondary function) from the data during running, so as to make a comparison between the coefficient of the function and the coefficient of the function prepared from the tire for summer use or the tire for winter use.

The comparison of calculations might be carried out at all times, but it is preferable to carry out extraction by sampling, as described above, from the viewpoint of reducing the effect by of running up the slope. Further, in order to exclude the effect caused by turning, it might be arranged to monitor the steering angle, lateral acceleration, etc. and in case of the judgment to be in turning, to exclude the data.

As a device to carry out the above steps, the tire identifying device of the present invention comprises:

(a) rotation speed measuring means for measuring the rotation speed of four tires fitted to wheels of a vehicle; and (b) calculating and identifying means for calculating the ratio of the front wheel rotation speed to the rear wheel rotation speed from the measured value by the rotation speed measuring device and identifying the kind of the fitted tire from the calculated front-rear wheel ratio value. The calculating and identifying means is so constituted as to be capable of identifying as to which of the upper or lower side of the threshold value of FIG. 8 the calculated front-rear wheel ratio value lies.

It is desirable that the tuning factors of both the tire for summer use and the tire for winter use are held by ECU, so that, depending on the identified results, automatic switchover to the tuning for summer tires or to the tuning for winter tires could be made. Manual operation is also possible.

FIG. 9 shows a determination of the judgment value range based on the graph for summer use out of the graph of the function of acceleration and the front-rear wheel ratio function. Explanation is given on the method of identifying as to whether the fitted tire is for summer use or not. The judgement value range is determined in the same manner as in FIG. 7.

The identification is carried out during running by the following steps.

(a) Rotation speed of four tires fitted to wheels of a vehicle and the acceleration in front-rear direction of vehicle are measured.

(b) Front-rear wheel ratio is calculated on the basis of the measured data of rotation speed.

(c) Identification is made as to whether the calculated value of front-rear wheel ratio lies within the judgement value range shown in the table of FIG. 9.

If the value is within the judgement value range, it follows that the tire has not been replaced and remains in the state of that for summer use, but if it is not within the judgement value range, then it is identified that the tire was changed to the other one (e.g., the tire for winter use).

FIG. 10 shows the threshold value determined on the basis of FIG. 6.

The identification is carried out during running according to the following steps.

(a) Rotation speed of four tires fitted to wheels of a vehicle and the front and rear direction acceleration of vehicle are measured.

(b) Front-rear wheel ratio is calculated on the basis of the measured data of rotation speed.

(c) Identification is made as to on which side, upper or lower side of the graph of threshold value shown in FIG. 10 the calculated front-rear wheel ratio value lies.

For example, when the calculated front-rear ratio value is above the threshold value in the range higher than 0, it is judged to be the tire for winter use, while when it is below the threshold value, it is judged to be the tire for summer use. As the means for sensing the front-rear direction speed of the vehicle, there can be used a G sensor such as a piezo-electric type or strain gauge type acceleration converter fitted to the vehicle, or a wheel speed sensor for detecting the variation in time of vehicle speed.

When the embodiments relating to claims 1 and 4 or claims 7 and 10 are used in a sole form, it might occur that the running at high speed is not easily carried out or acceleration/deceleration frequency is small to make the frequency of judgment less. Accordingly, it might be preferable to use the two methods at the same time to improve the precision of judgment. In practice, detection might be made by either side. Alternatively, arrangement might be made so that the system does not work unless it is judged by both methods that the tire has been changed.

As described above, the tire identifying method and device of the present invention are based on the notice that the difference of the pattern stiffness of the tire has influences on the slip ratio, and as it suffices that only the tire rotation information might be measured, utilization might be made of the means for measuring the rotation of tire such as ABS which is equipped on the vehicle control device, thus requiring small initial cost. Furthermore, by automating the tuning by tire, precision of the vehicle control device can be elevated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tire identifying method comprising:
   (a) measuring respective rotation speeds of four tires fitted to wheels of a vehicle;
   (b) calculating a ratio of front wheel rotation speed to rear wheel rotation speed using the measured rotation speeds;
   (c) preparing a function of speed and front-rear wheel speed ratio on the basis of data previously measured using a known kind of tire; and
   (d) identifying the kind of tire fitted to the wheels of the vehicle by comparing the calculated ratio with the prepared function.

2. The tire identifying method of claim 1, comprising identifying whether or not the fitted tires are of the known kind of tire by determining the prescribed judgement value range based on the function of speed and the front-rear wheel ratio and by determining whether or not the calculated value of the front-rear wheel ratio lies within the judgment value range.

3. The tire identifying method of claim 1, comprising in the case where the tires, which kind is known, are, two tires of different stiffness, setting a threshold value between the two functions of speed and front-rear wheel ratio prepared from data of the two tires, and identifying which of the two kinds of tires having different stiffness, the fitted tire belongs, depending on which side of the threshold value the front-rear wheel ratio value lies.

4. A tire identifying method comprising:
   (a) measuring respective rotation speeds of four tires fitted to wheels of a vehicle;
   (b) measuring front-rear direction acceleration of the vehicle;

(c) calculating a ratio of front wheel rotation speed to rear wheel rotation speed using the measured rotation speeds;

(d) preparing a function of speed and front-rear wheel speed ratio on the basis of data previously measured using a known kind of tire; and (e) identifying the kind of tire fitted to the wheels of the vehicle by comparing the calculated ratio with the prepared function of acceleration and front-rear wheel ratio prepared on the basis of data of the front-rear ratio by the predetermined acceleration, sequentially from a tire which kind is previously known.

5. The tire identifying method of claim 4, comprising identifying whether or not the fitted tires are of the known kind of tire by determining the prescribed judgement value range based on the above function of acceleration and front-rear wheel ratio and by determining whether or not the calculated amount of the front-rear wheel ratio lies within the judgement value range.

6. The tire identifying method of claim 4, comprising, in the case where the tires whose kind is known are two tires of different stiffness, setting a threshold value between the two functions of acceleration and front-rear wheel ratio prepared from data of the two tires, and identifying to which of the two kinds of tires having different stiffness the fitted tire belongs, depending on which side of the threshold value the front-rear wheel ratio value lies.

7. A tire identifying device comprising:

(a) means for measuring respective rotation speeds of four tires fitted to wheels of a vehicle;

(b) means for calculating a ratio of front wheel rotation speed to rear wheel rotation speed using the measured rotation speeds;

(c) means for preparing a function of speed and front-rear wheel speed ratio on the basis of data previously measured using a known kind of tire; and (d) means for identifying the kind of tire fitted to the wheels of the vehicle by comparing the calculated ratio with the prepared function.

8. The tire identifying device of claim 7, wherein the device identifies whether or not the fitted tires are of the known kind of tire by determining the prescribed judgement value range based on the function of speed and the front-rear wheel ratio, and by determining whether or not the calculated amount of the front-rear wheel ratio lies within the judgment value range.

9. A tire identifying device comprising:

(a) means for measuring respective rotation speeds of four tires fitted to wheels of a vehicle;

(b) front-rear direction acceleration measuring means for measuring front-rear direction acceleration of the vehicle;

(c) means for calculating a ratio of front wheel rotation speed using the measured rotation speeds;

(d) preparing a function of speed and front-rear wheel speed ratio on the basis of data previously measured using a known kind of tire; and (e) identifying the kind of tire fitted to the wheels of the vehicle by comparing the calculated front-rear wheel rotation with a function of acceleration and said front-rear wheel ratio on the basis of data from said tire, which kind is previously known.

10. The tire identifying device of claim 9, wherein the device identifies whether or not the fitted tires are of the known kind of tires by determining the prescribed judgement value range based on the function of acceleration and front-rear wheel ratio function, and by determining whether the calculated value of the front-rear wheel ratio lies within the judgment range.

11. The tire identifying device of claim 9, wherein the device is so designed, in the case where the tires, which kind is known, are two tires of different stiffness, to set a threshold value between the two functions of acceleration and front-rear wheel ratio prepared from data of the two tires, and to identify which of the two kinds of tires having different stiffness, the fitted tire belongs, depending on which side of the threshold value the front-rear wheel ratio value lies.

12. The tire identifying device of claim 8, wherein the device is so designed, in the case where the tires, which kind is known, are two tires of different stiffness, to set a threshold value between the two functions of speed and front-rear wheel ratio prepared from data of the two tires, and identify to which of the two kinds of tires having different stiffness, the fitted tire belongs, depending on which side of the threshold value the front-rear wheel ratio value lies.

* * * * *